United States Patent [19]

Hwang

[11] Patent Number: 4,992,037
[45] Date of Patent: Feb. 12, 1991

[54] MOLD FOR FORMING NATURAL LATEX LID

[75] Inventor: Wei-Chao Hwang, Panchiao City, Taiwan

[73] Assignee: BJL Industry (M) Sdn. Bhd., Selangor, Malaysia

[21] Appl. No.: 419,693

[22] Filed: Oct. 11, 1989

[51] Int. Cl.⁵ .................. B29C 41/14; B29C 41/40
[52] U.S. Cl. ............................. 425/275; 264/303;
425/271; 425/272; 425/274; 425/446
[58] Field of Search ............ 425/275, 269, 270, 271,
425/272, 274, 404, 445, 446; 264/303, 304, 347;
215/1 A, 229, 247, 249, 253; 220/90.2

[56] References Cited

U.S. PATENT DOCUMENTS 3,022,540  2/1962  Shapero ........................... 425/271
3,524,566  8/1970  Parks ............................. 220/90.2

FOREIGN PATENT DOCUMENTS 1047276  12/1953  France ............................ 425/270
504300   4/1971  Switzerland ..................... 425/269

Primary Examiner—James C. Housel
Attorney, Agent, or Firm—Ladas & Parry

[57] ABSTRACT

A mold used to form a latex lid for covering a beverage cup includes a body having a top forming face and a side forming face extending around and turning downward from the top forming face, a stubby projection which has a rounded surface, provided on the top forming face, a shallow recessed fink provided in the top forming face around the stubbing projection. In forming the latex lid, the stubby projection creates a thinned area in the latex lid which facilitates the insertion of a straw, and the shallow recessed sink provides a thickened reinforcing ring around the thinned area. A blind hole may be provided in the stubby projection to create an internal bursting force which can produce a hole in the thinned area.

6 Claims, 4 Drawing Sheets

MOLD FOR FORMING NATURAL LATEX LID

BACKGROUND OF THE PRESENT INVENTION

This invention relates to a mold, and, particularly to a mold for forming a latex lid to seal a beverage cup which has a thinned area preferably with a hole therein for the insertion of a straw.

It is known to provide a beverage cup with a plastic lid 1 which has a criss-cross cut 1a therein, as shown in FIG. 1, to permit the insertion of a straw. The plastic lid is semi-rigid and nonstretchable and must therefore be manufactured in different sizes to suit different sizes of cups. Moreover, since such plastic lids are usually made of polystyrene, the used lids create pollution problems when they are discarded or burned.

Another kind of lid used for beverage cups is made of a latex. The latex lid can effectively seal a cup. It is flexible and stretchable so that a latex lid with a certain dimension can be used for different sizes of cups. However, such a latex lid is not provided with any holes and, therefore, must be pierced with the end of a straw before the straw is inserted into the cup to which the lid is attached. In some cases, the small torn fragment of the lid created when piercing the latex lid falls into the content of the cup, thus possibly incurring the risk of the user sucking the fragment into his/her mouth. In many cases, the latex lid is accidentally torn by the piercing straw, causing the content in the cup to leak out from the tear.

SUMMARY OF THE INVENTION

It is an object of the invention to provide a novel mold to form a latex lid which overcomes the drawbacks described hereinbefore.

It is another object of the invention to provide a mold to form a latex lid for a beverage cup with an opening which facilitates the insertion of a straw into the cup. The latex lid formed by the mold of the present invention has the following advantages.

(1) The lid can effectively seal off the cup associated therewith.

(2) Although the straw hole is in the lid, the liquid in the cup does not leak through the hole when the cup is full because a vacuum is created in the cup. The hole is specifically dimensioned so that a straw can thread through the hole without leaving any clearance therearound.

(3) The lid is stretchable and thus can accommodate different sizes of cups.

(4) The lid is made of a natural rubber latex which degrades naturally and is formed into bacteria digestible proteins.

(5) The lid will neither become destroyed nor produce toxic substances when heated in a microwave oven.

(6) The stretchable characteristic of the lid is not changed when the lid is refrigerated.

According to the present invention, a mold for forming a latex lid comprises a body having a top forming face, and a side forming face extending around and turning downward from the top forming face, a stubby projection provided on the top forming face, a shallow recessed sink provided in the top forming face around the stubby projection. The stubby projection is provided with a rounded surface so as to avoid breakage of the latex film formed thereon. Preferably, a blind hole which opens upward is provided in the stubby projection to hold air which can create a bursting force to produce a hole in the latex film formed on the stubby projection.

In one aspect of the present invention, the top forming face of the mold is circular and the side forming face is cylindrical. The stubby projection is substantially in the shape of a cone with a rounded tip. The blind hole of the stubby projection has a diameter of less than 1.6 mm and the shallow recessed sink has a diameter of about 3.0–9.0 mm. The stubby projection has a height of about 1.0–3.0 mm from the top forming face of the mold.

The latex lid formed by the mold of the present invention has a top, a peripheral flange turning downward from the top, and a rolled rim around the peripheral flange. A thinned area which is thinner than the remaining portion of the top of the lid is formed by means of the stubby projection of the mold because the latex deposited on the stubby projection of the mold is more likely to be spun away than that deposited on the remaining forming faces of the mold due to the gravitational force and the centrifugal force created upon turning the mold after the mold is dipped into a latex. The shallow recessed sink allows more latex to be retained therein, thereby forming a thickened reinforcing ring around the thinned area.

The present exemplary preferred embodiment will be described in detail with reference to the accompanying drawings, in which:

DETAILED DESCRIPTION OF THE PREFERRED EMBODIMENTS

Figure 1:
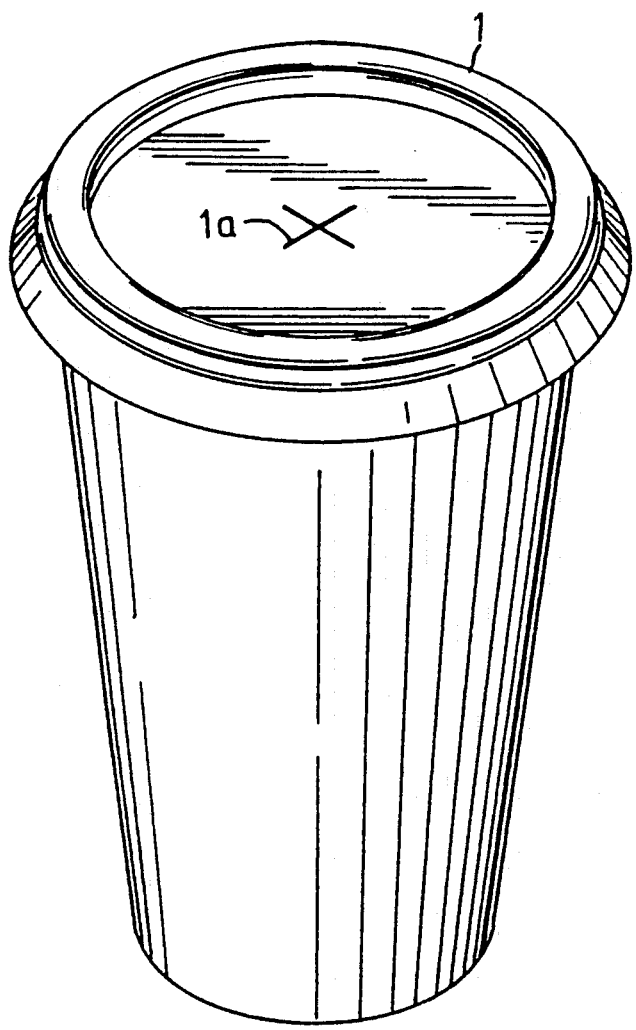
FIG. 1 shows a conventional plastic lid for a beverage cup.
Figure 2:
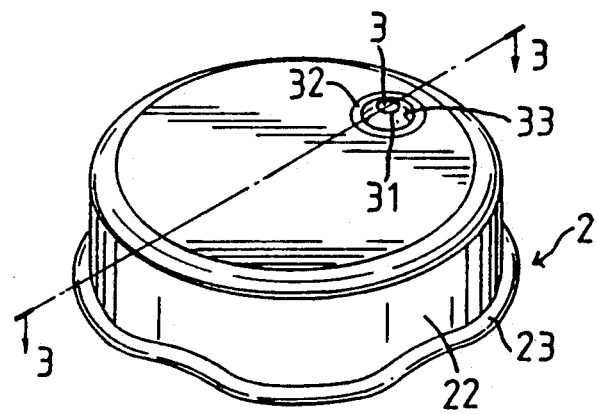
FIG. 2 is a perspective view of a latex lid formed by a mold of the present invention.
Figure 3:
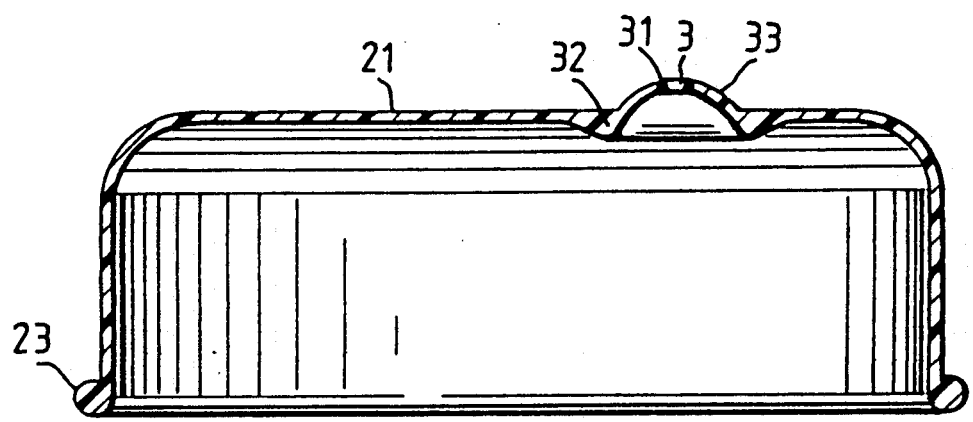
FIG. 3 is a sectional view taken along line 3–3 of FIG. 2.

FIGS. 2 and 3 show a latex lid which can be formed by a mold constructed according to the present invention. The latex lid is a cap-like piece 2 having a top 21, a peripheral flange 22 turning downward from the top 21, a rolled rim 23 along the peripheral flange 21, an opening 3 formed in a thinned area 33 of the top 21, a thickened marginal edge 31 around the opening 3, and a thickened reinforcing ring 32 in the top 21 around the thinned area 33.

Figure 4:
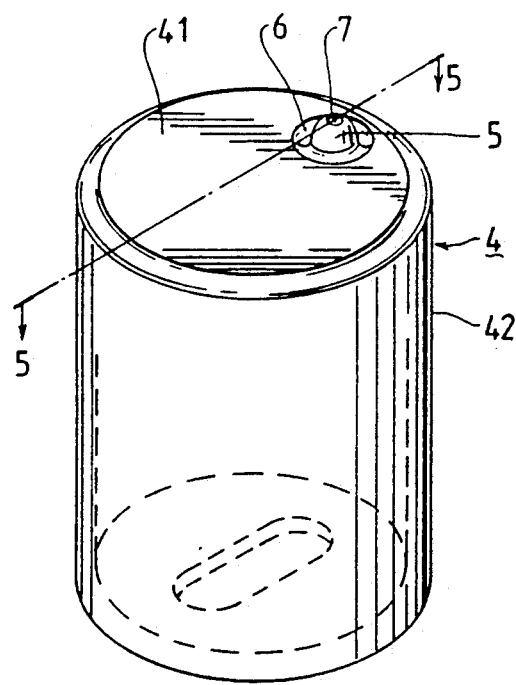
FIG. 4 is a perspective view of a mold embodying the present invention
Figure 5:
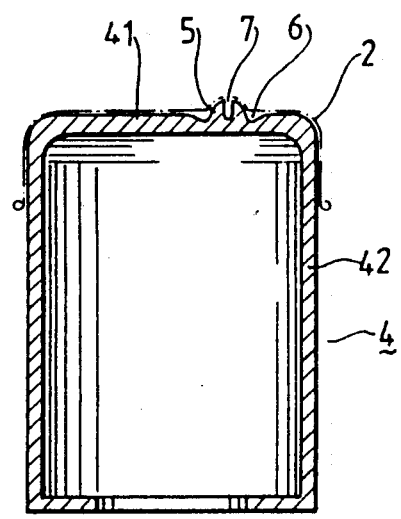
FIG. 5 is a sectional view taken along line 5—5 of FIG. 4.
Figure 6:
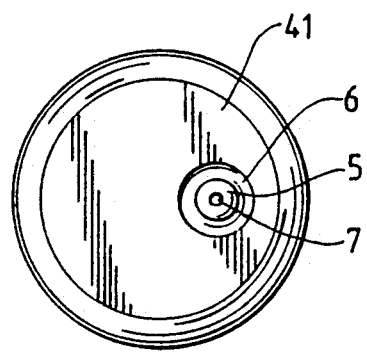
FIG. 6 is a top view of the mold of FIG. 4.

Referring to FIGS. 4, 5 and 6, the mold according to the present invention is a hollow body 4, having a top forming face 41 and a side-forming face 42 extending around and turning downward from the top forming face 41, a stubby projection 5 extending upward from the top forming face 41, and a shallow annular recessed sink 6 provided in the top forming face 41 around the stubby projection 5. A blind hole 7 which opens upward is provided in the stubby projection 5.

The stubby projection 5 has a rounded surface so that the latex film deposited thereon will never be pierced by the stubby projection 5. Preferably, the the stubby projection 5 has a cone-like shape with a rounded tip. The height of the stubby projection 5 from the top forming face 41 of the mold is about 2 mm. The diameter of the blind hole 7 may not be greater than that of a straw. The suitable range of the diameter may be 0.2 mm–1.6 mm. The diameter of the shallow recessed sink 6 is about 3.0–9.0 mm.

An example of a method for making the latex lid using the mold of the present invention is illustrated hereinunder.

EXAMPLE

A natural latex composition is prepared by using the following ingredients:

| Ingredients | parts by weight |
| --- | --- |
| Liquid natural rubber latex (Hevea Brasiliensis) 60% dry rubber content | 167 |
| 50% Sulphur dispersion | 3.0 |
| 50% Active zinc oxide dispersion | 0.8 |
| 50% Accelerator dispersion | 1.8 |
| 50% Antioxidant dispersion (butylated reaction product of p-cresol and dicyclopentadiene | 2.0 |
| Potassium laurate (20%) solution | 1.5 |
| Ammonium cassinate (15%) solution | 2.0 |
| Antiweb-WB agent | 1.0 |
| Antitact BJL-A | 2.4 |
| 10% potassium hydroxide solution | 10.0 |
| Pigment | a suitable amount |
| Flavour | a suitable amount |
| Water (to adjust the latex concentration to the required 36 ± 1% total solid content) | |
| A coagulant solution is prepared as follows: | |

| Components | Weight percent |
| --- | --- |
| Calcium nitrate | 3–5% |
| Wetting agent | 0.5–1.0 |
| Water | 88.0–91.5 |

A plurality of molds 4 are mounted on a moving bracket 8 which moves along a guide rail 9 to advance the molds 4 to the containers which separately receive the coagulant and the latex solution. The advancing operation is known and will not be detailed herein. The latex solution is stirred at 15 rpm for about 36 hours, and the coagulant solution is heated up and maintained at 45–50 deg C. The molds 4 are passed through a first oven maintained at 100 deg C. and then cooled down to 50–60 deg C.

The molds 4 are first sent to the coagulant container and dipped into the coagulant with a dwell time of about 5–8 seconds. When the molds 4 enter the coagulant container, they are held in a position in which the axis of the mold 4 is inclined at a certain angle, preferably 45 deg, relative to a vertical line. When each mold is withdrawn from the coagulant, it is also placed in the 45 deg inclining position. After each mold is withdrawn, the mold 4 is turned to make the top face 41 thereof face upward and is rotated at a high speed so as to remove the excess coagulant and keep a uniform film layer on the molding face of the mold. The mold coming out from the coagulant is turned so that the top face 41 thereof lies horizontally and is moved to a second oven kept at a temperature of 80–90 deg C. and then cooled down to 50–60 deg C.

Figure 7:
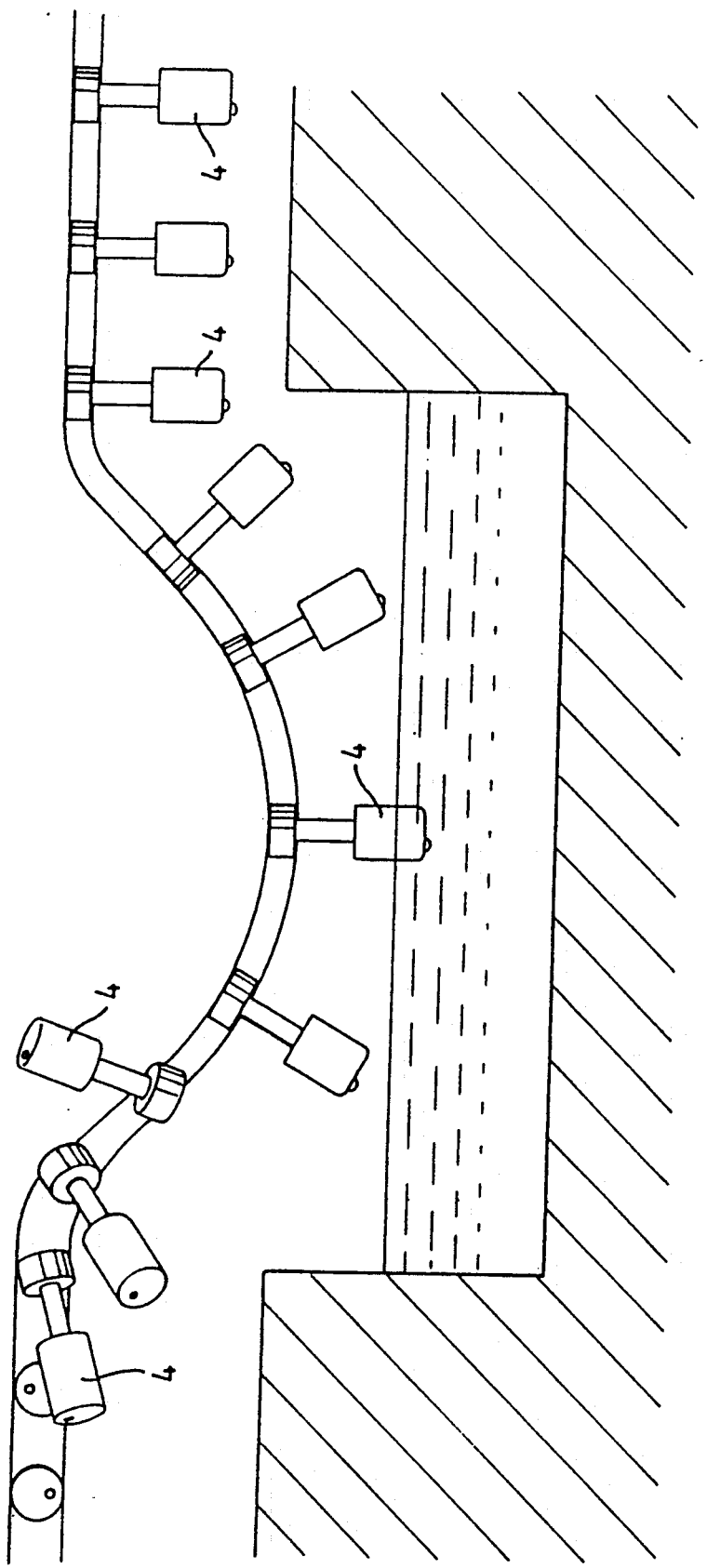
FIG. 7 is a schematic view showing the dipping operation using the mold of the present invention.

Afterwards, the molds are advanced to the latex container and dipped into the latex solution which is kept at 28–30 deg C., where the molds dwell for about 5–10 seconds. When the molds enter the container, they are also inclined in the same manner as they were in the coagulant tank. After the molds are withdrawn from the latex container, the top faces 41 of the molds are turned upward (FIG. 7) and the molds are again rotated at a high speed so as to keep a uniform latex layer on each mold 4. The withdrawn molds with their top faces 41 lying horizontally are advanced to a third oven which was maintained at 90–100 deg C. to gel the latex. The molds heated by the third oven are first passed through a beading station where the peripheral ends of the latex lid films which have been halfly hardened in a gel state are rolled by friction rollers, then a water-leaching station which is maintained at 75 deg C. for the removal of all possible remaining coagulant and other undesirable substances from the latex, and a curing oven maintained at about 120 deg C. so as to completely cure the latex film. The cured latex lids are cooled down to 60–70 deg C. Finally, the formed latex lids are removed from the molds.

The latex lids formed on the molding faces 41 and 42 of the mold 4 which have been dipped into the latex solution have the configuration as that shown in FIG. 2. The opening 3 in each latex lid 2 is created in the portion which are deposited on the stubby projection 5 of the mold 4 when the mold is heated by the third oven to 90 deg C.–100 deg C. At the temperature of the third oven, the gas pressure within the blind hole 7 increases, causing the film layer covering the blind hole 7 to burst. As the film layer covering the blind hole 7 bursts, the latex accumulates on the rim of the blind hole 7 due to the effect of the diffusion and the surface tension of the latex, therefore the thickened marginal edge 31 is forced, defining the opening 3. The thickened reinforcing ring 32 is formed from the latex deposited in the shallow recessed sink 6 of the mold 4.

Actually, when the mold 4 passes through the latex container in the dipping operation, the top 21 of the mold 4 faces or inclines downward. The latex covering the surface of the stubby projection 5 of the mold 4 is more likely to be spun away therefrom than the remaining portion of the deposited latex due to the gravitational force and the centrifugal force created by the rotation of the mold 4 at a certain speed when the mold 4 is withdrawn from the latex container and the top face 41 of the mold is turned upward quickly. Therefore, the latex film covering the stubby projection 5, i.e. the area 33 between the marginal edge 31 and the thickened reinforcing ring 33, is thinner than the remaining portion of the latex film, and more latex is retained in the shallow annular recessed sink 6 forming into the thickened reinforcing ring 32.

The surface of the thickened marginal edge is smooth. Usually, the insertion of a straw through the lid into the cup will not tear such a marginal edge. Even if a tearing of the latex film between the thickened marginal edge around the opening and the thickened reinforcing ring is caused by the insertion of a straw, the thickened reinforcing ring will restrict the tearing because the latex film surrounding the thickened reinforcing ring on the top of the lid is thicker than the area 33 of the lid. Moreover, the latex film surrounding the thickened reinforcing ring holds firmly this reinforcing ring thereby preventing the lid from being torn and dropped into the cup as may be occurred in the known latex lid described hereinbefore.

In order to form the opening 3, the gas pressure in the blind hole 7 must increase to an extent sufficient to burst the film layer covering the blind hole 7. In other words, the difference between the gas pressure within the blind hole 7 and the external pressure must be sufficiently large to cause the film layer to burst.

The pressure difference depends on the temperature to which the mold is heated after being dipped into the latex container, i.e. the temperature of the third oven in this example. The pressure difference can be estimate from the following expression of the ideal gas law:

$$PV = nRT$$

Assuming that V, n & R are constant, then $$\frac{P_1}{T_1} = \frac{P_2}{T_2}$$

where V is the volume of the gas inside the blind hole 7, T1 is the temperature of the latex container, P1 is the pressure in the blind hole 7 at the temperature T1, T2 is the temperature of the third oven, and P2 is the pressure in the blind hole 7 at the temperature T2. P1 is equal to the pressure outside the blind hole, i.e. 1 ATM (atmospheric pressure). Suppose that T1=(273+29) deg K, i.e. 29 deg C., and T2=(273+95) deg K, i.e. 95 deg C., then P2 will be 1.22 atm. Therefore, the pressure difference is about 0.22 atm.

The surface tension of the latex film depends on the concentration of the latex solution. The concentration of the latex solution is so chosen that it produces a force of surface tension less than the force to burst the film layer, i.e. the force created by the pressure difference. The total solid content of the latex solution used in this example 36±1%.

The bursting force ΔF which is created in the blind hole 7 can be determined mathematically from the expression:

ΔF = pressure difference X the cross-sectional area of the blind hole 7—the surface tension of the film layer covering the blind hole 7 X the circumference of the opening 3, $$i.e., \Delta F = (\Delta P)A - \eta(\pi D)$$

For example, if the total solid content of the latex solution is 60%, the specific gravity thereof is about 0.9504 g/cu.cm and the surface tension $\eta$ thereof is about 35 dyne/cm (from the related literature). Since P=0.22 atm, A=$\pi(D/2)^2$, where D=1.2 mm=0.12 cm, the bursting force Δ F is 243.27 dyne.

With the invention thus explained, it is apparent that various modifications and variations can be made without departing from the scope of the invention. It is therefore intended that the invention be limited only as indicated in the appended claims.

What I claim is:

1. A dipping mold for forming a latex lid comprising a body having a top forming face and a side forming face extending around and turning downward from said top forming face, a stubby projection which has a rounded surface, provided on said top forming face, and a shallow recessed sink provided in said top forming face around said stubby projection, said stubby projection being provided with a blind hole which opens upward.

2. A dipping mold for forming a latex lid as claimed in claim 1, wherein said top forming face is circular and said side forming face is cylindrical.

3. A mold for forming a latex lid as claimed in claim 1, wherein said stubby projection has a cone-like shape with a rounded tip.

4. A dipping mold for forming a latex lid as claimed in claim 1, wherein said blind hole has a diameter less than 1.6 mm.

5. A dipping mold for forming a latex lid as claimed in claim 4, wherein said shallow recessed sink has a diameter of about 3.0-9.0 mm.

6. A dipping mold for forming a latex lid as claimed in claim 1, wherein said stubby projection has a height of about 1.0-3.0 mm from said top forming face.

* * * * *